Sept. 21, 1965 E. T. STROM 3,207,248
RESILIENT HITCH
Filed Oct. 7, 1964 2 Sheets-Sheet 1
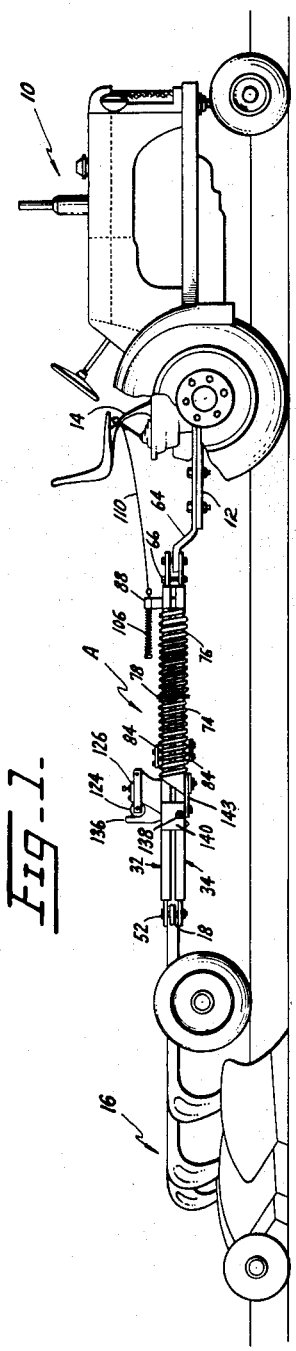
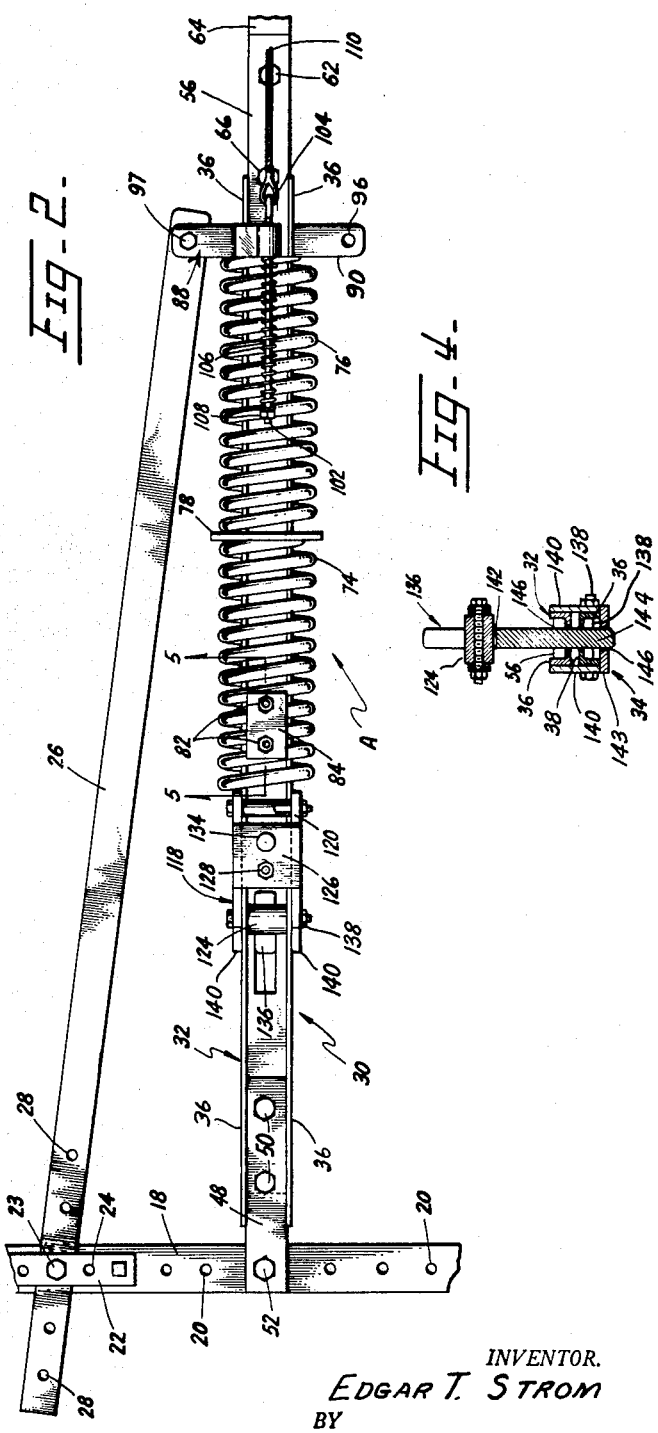
INVENTOR.
EDGAR T. STROM
BY
Meyers & Peterson
ATTORNEYS

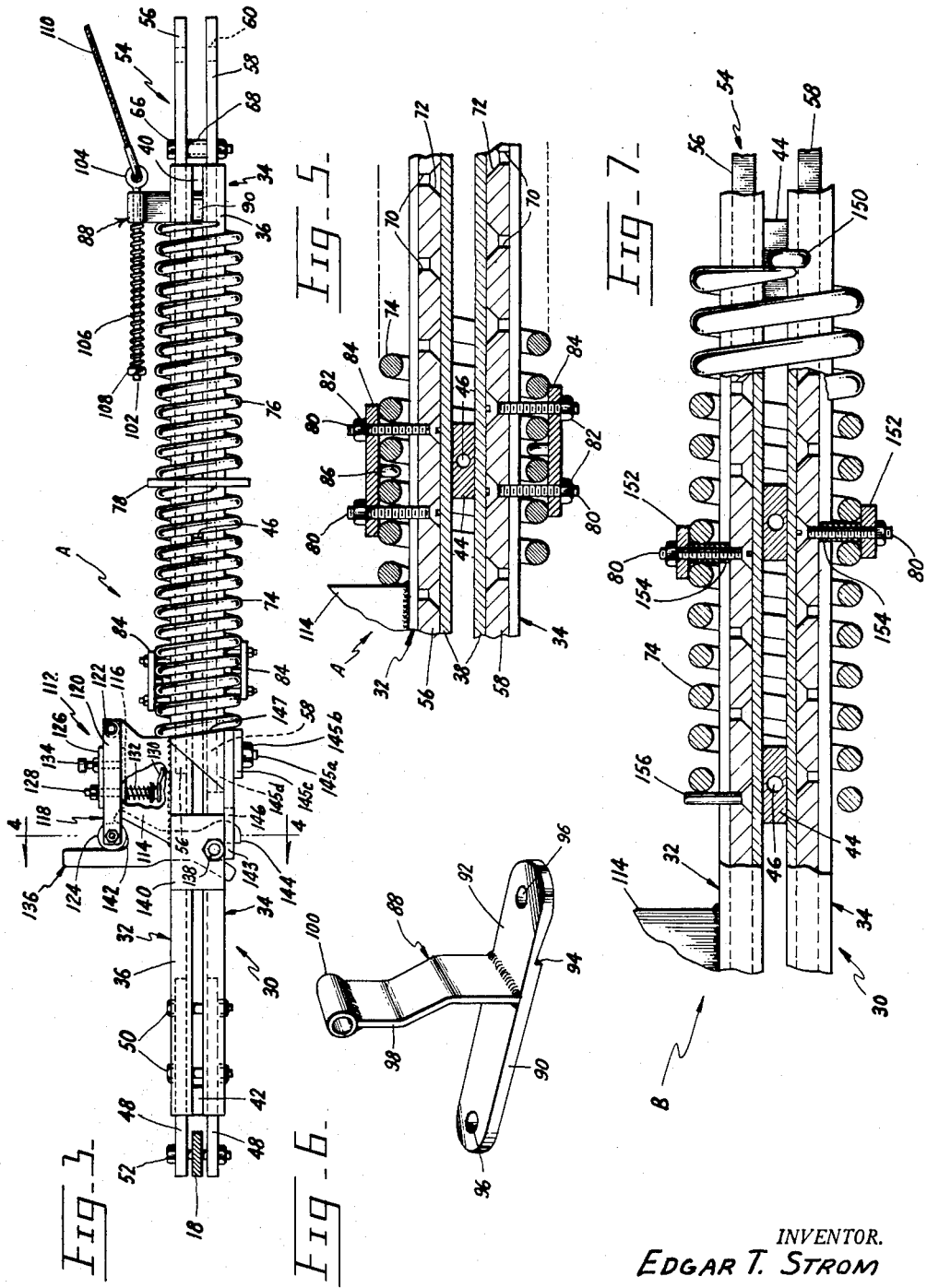

United States Patent Office 3,207,248
Patented Sept. 21, 1965

1

3,207,248
RESILIENT HITCH
Edgar T. Strom, Beulah, N. Dak.
Filed Oct. 7, 1964, Ser. No. 402,169
10 Claims. (Cl. 180—14.5)

This application is a continuation-in-part of my earlier filed application for Resilient Hitch, Serial Number 51,097, filed August 22, 1960, now abandoned.

This invention relates generally to hitches by which vehicles, farm implements, earth moving equipment and the like may be towed, and pertains more particularly to a hitch construction having various resilient characteristics that can be employed to adapt the hitch to a variety of needs. Inasmuch as the present invention overcomes the objections to prior art hitches that have been mentioned in my Patent No. 2,952,477, issued September 13, 1960, resort may be made thereto for a discussion of the objections to the prior art resilient hitches.

While the instant invention embodies the basic features incorporated into my above-referred-to patented invention, the invention herein described possesses certain advantages thereover. For instance, it is an object of this invention to provide a resilient hitch that is exceptionally sturdy and rigid for a given weight, thereby making the hitch well suited for heavy duty work. Also, it is an aim of the present invention to provide a hitch that is more versatile, permitting the user to achieve various desired results, the need for which will be frequently encountered in the field or at the location where the hitch is actually being employed. In this latter regard, provision is made for the rapid change in the number of coil springs that are employed. Also, the user may easily change the amount of resilient cushioning that is available for any particular spring. Still further, the invention has for an additional feature the provision of a simplified declutching mechanism that is exceedingly satisfactory for removing the towing power where obstacles such as roots, large rocks, and the like are encountered, thereby avoiding any damage to the hitch itself or to the implement being towed.

Another object is to provide a telescoping hitch in which the relatively movable parts are effectively and simply guided in their longitudinal movement with respect to each other.

Other objects will be in part obvious and in part pointed out more in detail hereinafter.

The invention accordingly consists in the features of construction, combination of elements and arrangement of parts which will be exemplified in the construction hereinafter set forth and the scope of the application which will be indicated in the appended claims.

In the drawings:

FIGURE 1 is a side elevational view illustrating my hitch when arranged for one type of operation;

FIGURE 2 is an enlarged plan view of my hitch corresponding to FIGURE 1 with certain of the parts to which it is attached also being fragmentarily shown;

FIGURE 3 is a side elevational view of the hitch as it appears in FIGURE 2;

FIGURE 4 is a sectional view taken in the direction of line 4—4 of both FIGURES 2 and 3;

FIGURE 5 is an even larger sectional view taken in the general direction of line 5—5 of FIGURE 2;

FIGURE 6 is a greatly enlarged perspective detail of one part employed in the declutching mechanism, and FIGURE 7 is a view generally similar to FIGURE 5 but expanded longitudinally to show a complete coil spring largely in section, the view also depicting certain modifications that are readily available to the user.

Owing to the versatility afforded the user of my invention, it has become desirable for purposes of description to distinguish one connected or assembled form of my resilient hitch from another form. With this in mind, the manner in which the hitch is connected or assembled in FIGURES 1, 2, 3 and 5 has been given the character A, whereas the way the hitch is set up in FIGURE 7 has been assigned the character B. Strictly speaking, the arrangements A and B do not represent different embodiments, but merely different modifications that can be accomplished with the basic hitch construction.

Referring first in detail to FIGURE 1, it will be noted that for purposes of illustration a tractor 10 has been pictured, the forward end of my resilient hitch A being attached to the rear end thereof via a drawbar 12 which is normally provided as a permanent part of the tractor. Also, as is typical with tractors of this character, a declutching lever 14 is depicted. Because the invention has for a feature the provision of an improved declutching mechanism, more will be said later on with respect to the role played by the lever 14.

The rear end of the hitch A is appropriately connected to the forward end of a plow 16 which is but one of many implements that may be pulled with a hitch of the envisaged construction. The plow 16 is equipped in this instance with a cross beam 18 having a plurality of spaced apertures 20 therein. To certain of the apertures 20 is affixed a bracket 22 formed with a central raised portion and having several apertures 24 aligned with additional apertures 20 that are concealed by the bracket 22. Through the agency of a pin 23 a control arm 26 is connected to the bracket 22. The control arm 26 contains a number of apertures 28 by which the furrowing of the trailing plow 16 may be governed. The way in which the forward end of the arm 26 is connected to the hitch A will be described with more particularity later on.

As can best be seen from FIGURES 2-5, the hitch A comprises what will be termed a first draft unit 30. This draft unit 30 is composed of a pair of elongated channel members 32, 34, each having side flanges 36 and a horizontal connecting web 38. From FIGURE 3, it can be discerned that the opposite ends of the members 32, 34 are integrally connected by spacer blocks 40, 42 these spacer blocks being welded between the ends of these members so as to assist in retaining them in a slightly spaced relationship. Additional blocks 44 are spaced at intervals between the end blocks 40 and 42, these intermediate blocks 44 each having a transverse aperture 46 (best seen in FIGURE 7) extending therethrough for a purpose hereinafter explained. Where the webs 38 of the members 32, 34 are made contiguous, the apertures 46 would then be provided in the flanges 36 of either or both members 32, 34.

At the rear end of the hitch A is a rearwardly projecting tongue unit comprised of a pair of upper and lower flat strips 48 held within the channel members 32, 34 by means of through bolts 50. A similar bolt 52 extends through the projecting ends of the tongue strips 48 so as to provide the coupling to the cross beam 18. The tongue arrangement that has been depicted is, of course, exemplary, different schemes being readily available for effecting the desired coupling to the implement that is to be pulled.

Next to be described is the second draft unit which has been designated generally by the reference numeral 54. This draft unit 54 includes a pair of elongated strips 56, 58 that are slidably accommodated by the channel members 32, 34 comprising the first draft unit 30. These strips 56, 58 are formed with aligned apertures 60 for the reception of a bolt 62 which extends through an adapter labeled 64 which is secured to the drawbar 12, if the drawbar 12 is not at the desired elevation. As with the rear end of the hitch A, the forward end just described may be connected to the tractor or towing vehicle in various ways.

Although not essential, a through bolt 66 has been shown as extending through the strips 56, 58 of the second draft unit 54, this bolt 66 having circumscribed thereabout a sleeve 68 which has a length equal to the spacing that the members 56 and 58 are to assume. The strip members 56, 58 are formed with a plurality of apertures 70 spaced therealong, these apertures in the illustrated instance having chamfered ends 72. The function of the apertures 70 will presently be described.

One important feature of the present invention is the employment of one or more coil springs which encircle both of the draft units 30 and 54. While the arrangement labeled A has incorporated thereinto two coil springs 74, 76, it can be pointed out at this time that it is possible to use only one of these springs depending upon the particular use to which the hitch is being put. For instance, the arrangement B depicted in FIGURE 7 utilizes but one spring. In the arrangement A, a division plate 78 has a cutout opening extending therethrough so that it can be inserted over the two units 30, 56. The purpose of the division plate 78 is merely to provide a suitable planar surface on either side so that the end of the coil spring 34 can abut one face thereof and the adjacent end of the coil spring 36 can engage the other face of this plate.

It can best be seen from FIGURE 5 that the means for connecting the draft unit 54 to the coil spring 74 comprises a pair of flat-headed bolts or threaded studs 80 which project outwardly from each strip 56, 58, the ends of these elements having suitable nuts 82 threadedly received thereon. Intermediate the nuts 82 and the outer periphery of the coil spring 74 is a plate 84 having a pair of apertures therein for the accommodation of the elements 80. Each plate 84 is provided with an inwardly extending lug 86 that is disposed between adjacent coils of the spring 74. In the illustrated situation, the studs 80 straddle two coils of the spring 74, the lug 86 residing between these coils. Consequently, it will be discerned that when the upper and lower nuts 82 are tightened sufficiently the strip members 56, 58 will be drawn against the inner diameter of the coil spring 74 and will be held in this relationship. Therefore, it is desirable that the length of the sleeve 68 through which the bolt 66 extends be selected with this in mind.

While the part denoted by the numeral 88 in FIGURE 6 may be considered as part of the declutching mechanism now to be referred to, it will be manifest that this serves a dual purpose. Accordingly, the member or part 88 comprises a pair of laterally extending ears 90, 92. The ear 92 is formed with a bottom notch 94 which engages a small projection on the upper side of the web 38 of the channel member 34. This projection on the web 38 has not been illustrated because it is of minor importance and would unduly complicate the drawings to show such an arrangement. It will be understood that the ear 90 is pushed through the intervening space provided between the upper and lower channel members 32, 34 of the first draft unit 30. Such a disposition places the upstanding arm 98 of the part 88 to one side of the hitch A, this being on the far side of the hitch as viewed in FIGURE 3. The arm 88 is offset so that its tubular bushing 100 at its upper end will reside approximately at the center of the hitch, this being the position shown best in FIGURE 2.

It has already been stated that the part 88 serves a dual purpose. The first office of this part, by reason of the laterally extending ears 90, 92 is to serve as an abutment for the coil spring 76. In other words, the spring 74 can be circumscribed about the draft units 30, 54, the plate 78 can then be positioned, and then the coil spring 76 can be added. After the coil spring 76 has been properly positioned, the part 98 can be inserted through the space between the upper and lower channel members 32, 34. Depending upon the side that the control arm 26 has been positioned on, the aperture 96 residing on this same side will serve as a ready means for connecting the control arm to the hitch, a bolt 97 completing this attachment.

The other specific function assigned to the part 88 is in conjunction with the declutching of the lever 14 on the tractor 10. With the declutching aim in mind, a rod 102 is reciprocably disposed through the bushing 100, this rod having an eye 104 at one end. A coil spring 106 encircles the major portion of the rod and bears against one side of a nut 108 threadedly attached on the end of the rod 102. The eye 104 has attached thereto one end of a cable 110, the other end of the cable being connected to the lever 14. The manner in which the lever 14 is disengaged or pulled rearwardly as viewed in FIGURE 1 is believed apparent from the description given so far. However, further explanation will be presented during an operational sequence.

For the purpose of normally maintaining the two draft units 30 and 54 together, yet permitting relative longitudinal movement of these draft units when the hitch encounters an overloading as by the plow 16 striking an embedded obstacle, a latch mechanism 112 is employed. This mechanism 112 includes a pair of upstanding plates 114 having their lower edges welded or otherwise affixed to the sides 36 of the upper channel member 32. At a preferred elevation between these two plates 114 is a horizontal plate or web 116, this plate 116 being permanently attached to the inner sides of the plates 114. What amounts to a bolt means is employed as a portion of the latch mechanism 112, the bolt means including a pair of spaced strips 120. These strips 120 are pivotally supported on the plates 114 by a transverse pin 122. The ends of the strips 120 opposite the end which is pivotally connected to the plates 140 supports a roller 124 by which the latching together of the two units 30, 54 is realized. More will be said presently concerning the element engaged by the roller 124. At this time, though, it is to be pointed out that the means 118 further includes a plate 126 secured to the upper edges of the strips 120 so as to be movable in unison therewith. Means 118 is normally biased downwardly. This biasing action is achieved through the instrumentality of a bolt or threaded stud 128 carrying a guide foot 130 at its lower end. Interposed between the guide foot 130 and the lower side of the plate 116 is a coil spring 132, the coil spring 132 reacting against the fixed plate 116 so as to urge the foot 130 downwardly together with the stud 128 to which it is attached. The foot 130, it may be mentioned, is of a width so as to fit within the parallel plates 114 and thereby provides a guiding action for the stud 128 and also for the entire means labeled 118. While the compression of the spring 132 can be adjusted to increase or decrease the downward bias of the means 118, it is also desirable to limit the downward movement of the means 118. This downward limiting of the movement is derived through the medium of a bolt 134 which is threadedly engaged with the plate 116 and has its lower end bearing against the upper side of the fixed plate 116. Hence, by tightening the bolt 134, that is, moving its lower end downwardly in relation to the plate 126, the means 118 will be raised from the position in which it now appears. This in turn will raise the roller 124.

The roller 124 is normally engaged with a hasp denoted generally by the reference numeral 136, the hasp 136 being pivotal by virtue of a transverse pin 138 extending through a pair of plates 140 that are welded or otherwise secured to the channel members 32 and 34. The hasp 136 is formed with a notch 142 which cradles or receives the roller 124. Owing to the bias imparted to the means 118, a dog 144 integral with the hasp 136 is caused to be rotated in a clockwise direction as viewed in FIGURE 3. The dog 144 is in this way forced into engagement with an aperture 146 formed in a rectangular clevis plate 143 fixedly attached to the lower strip 58 through the agency of a bolt 145a and a nut labeled 145b, there being a washer 145c also present. A spacer 145d is also utilized, although such spacer is not essential. It will be apparent from the drawings, particularly FIGURES 1 and 5, that the clevis plate 143 lies outside the channel in which the strip 58 slides and is in offset parallel relation to the strip 58. Welded to the clevis plate 143 along their horizontal edges are triangular side guides 147, the vertical edges thereof abutting the adjacent end of the coil spring 74 in the illustrated instance (see FIGURE 4).

Having presented the foregoing information, it is believed that it will be apparent as to how the hitch labeled A operates. During normal usage the first draft unit 30 will be solidly connected to the second draft unit 54 through the agency of the latch mechanism 112. This is so because the dog 144 will at this time be engaging the aperture 146 due to the downward bias given to the means 118. When the plow 16 encounters any sort of obstacle which would impose too severe a load on either the plow 16 or the hitch A, the second draft unit 54 which is connected at its forward end to the tractor 10 will act on the dog 144 so as to rotate the hasp 136 in a counterclockwise direction as viewed in FIGURE 3. This action, if sufficient, will force the roller 124 out of the notch 142, thereby permitting the hasp 136 to rotate at its counterclockwise direction to such an extent that the dog 144 will completely disengage itself from the clevis plate 143 which is attached to the strip 58 belonging to the second draft unit 54. After such disengagement has occurred, the second draft unit 54 is free to move forwardly, resisted only by the action of the springs 74, 76. Due to the compression of the springs 74, 76, since the spring 76 is restrained by the laterally extending ears 90, 92, the shock is effectively absorbed by these springs.

It will be understood, that the declutching mechanism becomes operative before the springs 74, 76 are completely compressed. The declutching is automatically achieved because the tractor 10 is still moving forwardly and the forward motion of the first draft unit 30 is, of course, resisted by the obstacle that has been encountered. This creates a compression of the spring 106 with a concomitant relative slowing down of the forward movement of the rod 102. Due to the relative movement of the tractor 10 with respect to the rod 102, sufficient tripping force is applied to the clutch lever 14 so as to disengage the clutch on the tractor. With the tractor's clutch disengaged, it is only the forward momentum of the tractor that actually exerts any real compressive action on the springs 74, 76. In most instances, the springs 74 and 76, upon expansion, will pull the tractor 10 backward after disengagement of its clutch with an automatic reengagement of the dog 144 with the aperture 146. In this way, the hitch A is immediately available for use once again providing the obstacle that has been engaged by the plow 16 is either removed or the plow raised sufficiently so as to pass over the obstacle.

The general versatility of the hitch herein described has been already alluded to. In order to provide a better understanding of the extent of the versatility and flexibility of my hitch, attention is now directed to FIGURE 7 where the arrangement B is set forth. As already indicated, the arrangement B is not, strictly speaking, a separate embodiment. Instead, it is a modification that is readily realized with only a substitution of certain parts. In this regard, the arrangement A included the employment of the two coil springs 74, 76. In the present instance, either one of these springs is utilized by itself. Up to this moment, no use has been stated for the apertures 46 in the spacer blocks 44. At this time, it can be explained that the spacer blocks 44 will normally be spaced at intervals of approximately half the length of either spring 74, 76. However, this spacing is largely left to preference. The purpose of the transverse apertures 46 is for the selective accommodation of an L-shaped pin 150. Anyone of the apertures 46 may be utilized, the pin 150 simply being inserted in the one that will serve the best purpose. In any event, it will be seen that the pin 150 functions as a stop for one end of the coil spring 74. Thus, instead of having to abut against the part 88, the present arrangement B contemplates that the pin 150 will function as the desired stopping element.

The strips 56, 58, as can be seen from FIGURE 7, have in the present instance only one bolt or stud element 80 passing therethrough. Consequently, only a conventional washer 152 is needed between the nut 82 and the exterior of the coil spring 74. However, it is highly desirable that a sleeve 154 be employed, the outer diameter of this sleeve being such as to be snugly received between adjacent coils of the spring 74. In other words, the plate 84 together with its lug 86 plus the second stud element 82 for each strip 56, 58 are all dispensed with. However, the arrangement depicted in FIGURE 5 is somewhat sturdier than that depicted in FIGURE 7.

While the stud elements 80 in either the arrangement A or B may be disposed at any selected location along the spring 74, the location of the upper and lower studs 80 in FIGURE 7 has been selected so that they are approximately at the middle of the spring 74. An unthreaded pin 156 has been inserted through one of the apertures 70 so as to bear against the left end of the spring 74. This causes the hitch B to pull in a double manner, for the centrally located stud elements 80 will act against the forward or right half of the coil spring 74 and the pin 156 will act against the rear or left half. It will, of course, be appreciated that if a second pin 156 is desired, it can be employed, then extending downwardly through the lower strip 58. It will be further understood that the pins 150 and 156 may be positioned so that the latch mechanism 112 will be operative when the arrangement B is employed. Also, it will be appreciated that the pin 156 can be used in the arrangement labeled A if somewhat shorter springs are employed than those actually depicted. Likewise, the use of a single upper and lower pin 80, together with appropriate sleeves 154, can be employed in the two-spring arrangement shown in the earlier described figures. This information is given solely to stress that the arrangements A and B are not separate and distinct from each other, but that desirable features may be combined from either arrangement in order to meet the task at hand. Still further, it should perhaps be pointed out that when one spring, or for that matter where two shorter springs are used, the latch mechanism 112 may well retain the spring 74 in a spaced relationship from the L-shaped pin 150, permitting the spring 74 to move forwardly only when an obstacle is struck and the latch 112 is urged into a released condition. Because of the basic similarity between the arrangements A and B, it is felt that the use of the arrangement B as shown will be easily understood. Consequently, no specific operational sequence will be presented.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A resilient hitch comprising a first elongated draft unit having an H-shaped cross-section providing a channel extending longitudinally along opposite faces thereof, a second draft unit including a pair of elongated strips slidably received in each of said channels so as to be longitudinally guided thereby, a coil spring closely encircling both of said draft units so as to be restrained against buckling by said first draft unit and to slidably retain the elongated strips of said second draft unit in said channels, means limiting movement of said coil spring relative to said first draft unit, and means fixedly carried by said second draft unit and projecting outwardly between certain of the coils constituting said spring to connect said second draft unit to a preferred longitudinal portion of said spring.

2. A resilient hitch in accordance with claim 1 in which said connecting means includes a pair of longitudinally spaced bolts, a plate provided with apertures in registry with said bolts, and nut members on the projecting ends of said bolts.

3. A resilient hitch comprising a first elongated draft unit having a channel extending longitudinally thereof, a second draft unit slidably received in said channel, a coil spring encircling both of said draft units, means limiting movement of said coil spring relative to said first draft unit, and means fixedly carried by said second draft unit and projecting outwardly between certain of the coils constituting said spring to connect said second draft unit to a preferred longitudinal portion of said spring, said connecting means including a single bolt, a sleeve element encircling said bolt having a diameter equal to the normal spacing between adjacent coils, a nut member on the projecting end of said bolt, and a washer between said nut member and said adjacent coils.

4. A resilient hitch comprising a first elongated draft unit having a channel extending longitudinally thereof and having a plurality of transverse apertures extending therethrough for the respective accommodation of a transverse pin at selected locations, a second draft unit slidably received in said channel, a coil spring encircling both of said draft units, said transverse pin when inserted through a selected aperture limiting movement of said coil spring relative to said first draft unit, and stud means fixedly carried by said second draft unit and projecting outwardly between certain of the coils constituting said spring to connect said second draft unit to a preferred longitudinal portion of said spring, said second draft unit being provided with a plurality of apertures spaced therealong for the accommodation of said stud means.

5. A resilient hitch comprising a first elongated draft unit including a pair of U-shaped channel members in a back-to-back relation, a series of spacer elements fixedly disposed between said channel members for maintaining said channel members in a spaced relation and said spacer elements each being provided with a transverse aperture for the respective accommodation of a transverse pin at selected locations, a second draft unit slidably received in at least one of said channels, a coil spring encircling both of said draft units, means limiting movement of said coil spring relative to said first draft unit, said transverse pin and the selected spacer element constituting said limiting means, and a stud element extending through a preferred portion of said second draft unit so as to project outwardly between certain coils constituting said spring to connect said second draft unit to a preferred portion of said spring.

6. A resilient hitch comprising a first elongated draft unit having an H-shaped cross-section to provide a pair of oppositely-facing channels extending longitudinal thereof, a second draft unit including a pair of elongated strips, one strip being slidably received in one channel and the other strip being slidably received in the other channel, a coil spring encircling both of said draft units, means limiting movement of said coil spring relative to said first draft unit, a stud element extending through said one strip of said second draft unit so as to project outwardly between certain coils constituting said spring to connect said second draft unit to a preferred portion of said spring, and an additional stud element extending through said other strip so as to project outwardly in an opposite direction between certain coils constituting said spring.

7. A resilient hitch comprising a first elongated draft unit having an H-shaped cross-section to provide a pair of oppositely-facing channels extending longitudinally thereof, a draft unit including an elongated strip slidably received in one of said channels, said strip having a series of apertures extending between opposite faces thereof, and also having means defining a recess fixedly attached thereto, a coil encircling both of said draft units, means limiting movement of said coil spring relative to said first draft unit, a stud element received in a selected one of said apertures and projecting outwardly between certain coils constituting said spring to connect said second draft unit to a preferred portion of said spring, a latch mechanism carried by said first draft unit including a pivotal hasp engageable in said recess to normally prevent said draft units from moving longitudinally with respect to each other, spring means resisting disengagement of said hasp from said recess, and a clutch release mechanism carried by said first draft unit including an upright member having a tubular element at the upper end, a rod slidably received in said tubular element, and a coil spring encircling said rod to normally urge said rod in a direction away from the towing vehicle.

8. A resilient hitch comprising a first elongated draft unit having an H-shaped cross-section to provide a pair of oppositely-facing channels extending longitudinally thereof, said draft unit being provided with a transverse slot, a second draft unit including an elongated strip slidably received in one of said channels, said strip having a series of apertures extending between opposite faces thereof and means defining a recess fixedly attached thereto, a coil spring encircling both of said draft units, means limiting movement of said coil spring relative to said first draft unit, a stud element received in a selected one of said apertures and projecting outwardly between certain coils constituting said spring to connect said second draft unit to a preferred portion of said spring, a latch mechanism carried by said first draft unit including a pivotal hasp engageable in said recess, said latch mechanism further including spring means resisting disengagement of said hasp from said recess, and a clutch release mechanism carried by said first draft unit, said release mechanism including an upright member having a tubular element at the upper end and having a horizontal portion thereof detachably received in said transverse slot with one end of said coil spring being engageaable therewith, said release mechanism further including a rod slidably received in said tubular element and a coil spring encircling said rod to normally urge said rod in a direction away from the towing vehicle.

9. A resilient hitch comprising a first elongated draft unit having a channel extending longitudinally thereof, a second draft unit slidably received in said channel, a latch mechanism carried by said first draft unit including a pivotally mounted hasp having a notch therein, bolt means offset from said draft units, and normally and releasably received in said notch, spring means biasing said bolt means into said notch, and laterally projecting support means affixed to said first draft unit for maintaining said offset relation, said second draft unit having abutment means constituting a recess in said second draft unit, and said hasp having an integral dog engaging said abutment means when said bolt means is received in said notch, whereby when sufficient force is applied to said draft units, said bolt means will overcome the action of said biasing means and be urged out of said notch to cause disengagement of said draft units, a coil spring encircling both of said draft units, and means fixedly carried by said second draft unit and projecting outwardly between certain of the coils constituting said spring to connect said second draft unit to a preferred longitudinal portion of said spring, whereby when said latch mechanism is released one end of said coil spring will move away from said support means under the urging of outwardly projecting means.

10. A resilient hitch comprising a first elongated draft unit having a channel extending longitudinally thereof, a second draft unit slidably received in said channel, a coil spring encircling both said draft units, latch means for connecting said draft units together in rigid relation under normal conditions of draw on said hitch and for releasing said draft units to slide relative to one another upon the occurrence of an overload on said hitch, said latch means including a hasp pivotally mounted on said first draft unit, spring biased in one direction, and a clevis plate fixedly attached to said second draft unit in offset parallel relation thereto and lying outside said channel, said clevis plate having a recess therein for receiving said hasp in the latched condition and further having means thereon in engagement with one end of said coil spring for limiting motion of said coil spring with respect to said second draft unit, said clevis plate and recess operating to rotate said hasp in the direction opposite to bias direction to force said hasp out of said recess upon the occurrence of an overload.

References Cited by the Examiner
UNITED STATES PATENTS

| | | | |
|---|---|---|---|
| 1,038,576 | 9/12 | Heinss | 152—92 |
| 1,305,651 | 6/19 | Kaiser | 180—14.5 |
| 1,872,106 | 8/32 | Bolen | 180—14.5 |
| 2,808,119 | 10/57 | Steinman | 180—14.5 |
| 2,952,477 | 9/60 | Strom | 280—487 |

BENJAMIN HERSH, *Primary Examiner.*

A. HARRY LEVY, *Examiner.*